Dec. 6, 1966    G. F. QUAYLE    3,289,870
POWER LINE REEL FOR A LIFT TRUCK
Filed Dec. 24, 1964    4 Sheets-Sheet 2
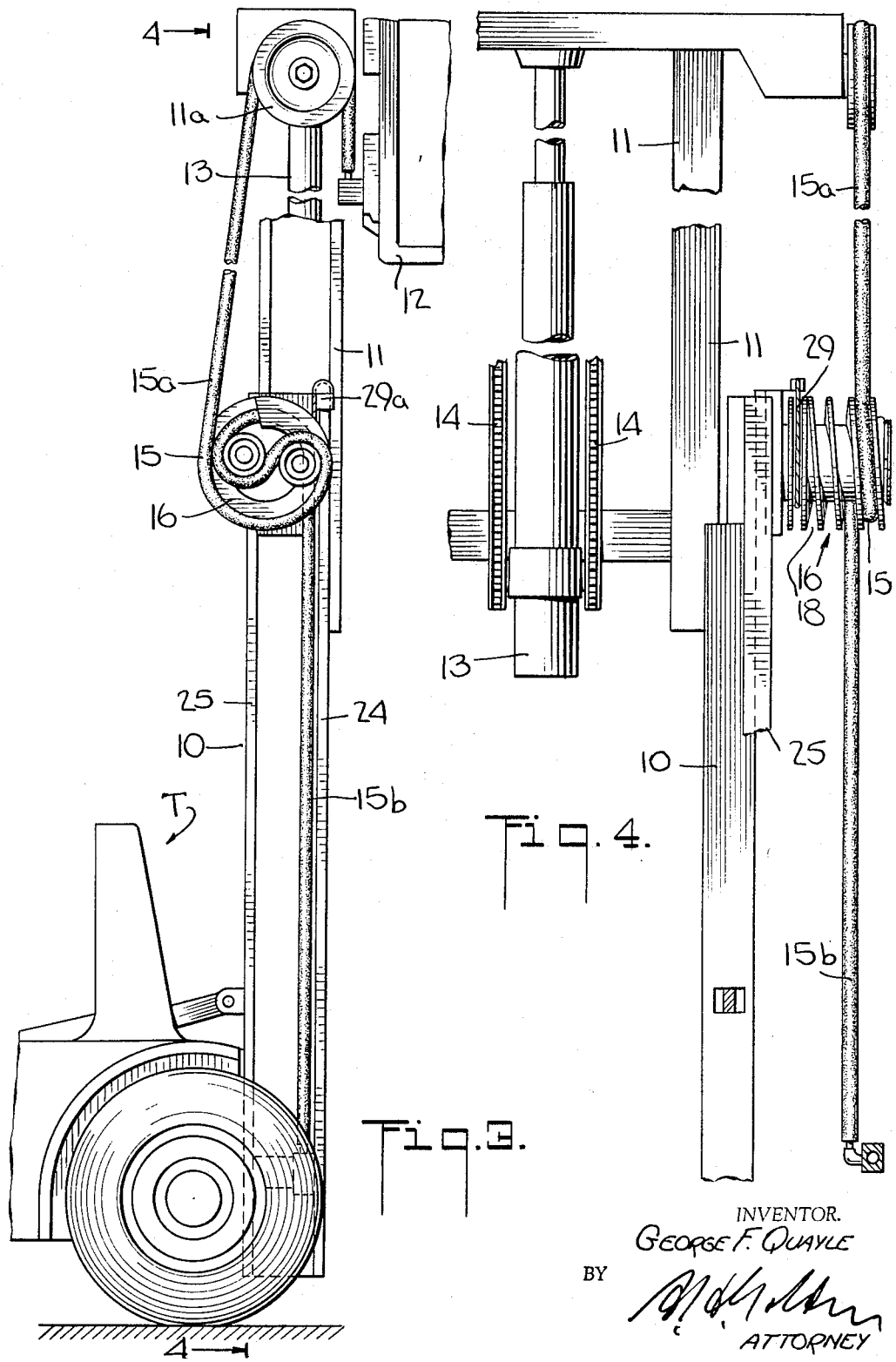
INVENTOR.
GEORGE F. QUAYLE
BY
ATTORNEY Dec. 6, 1966    G. F. QUAYLE    3,289,870
POWER LINE REEL FOR A LIFT TRUCK
Filed Dec. 24, 1964    4 Sheets-Sheet 3

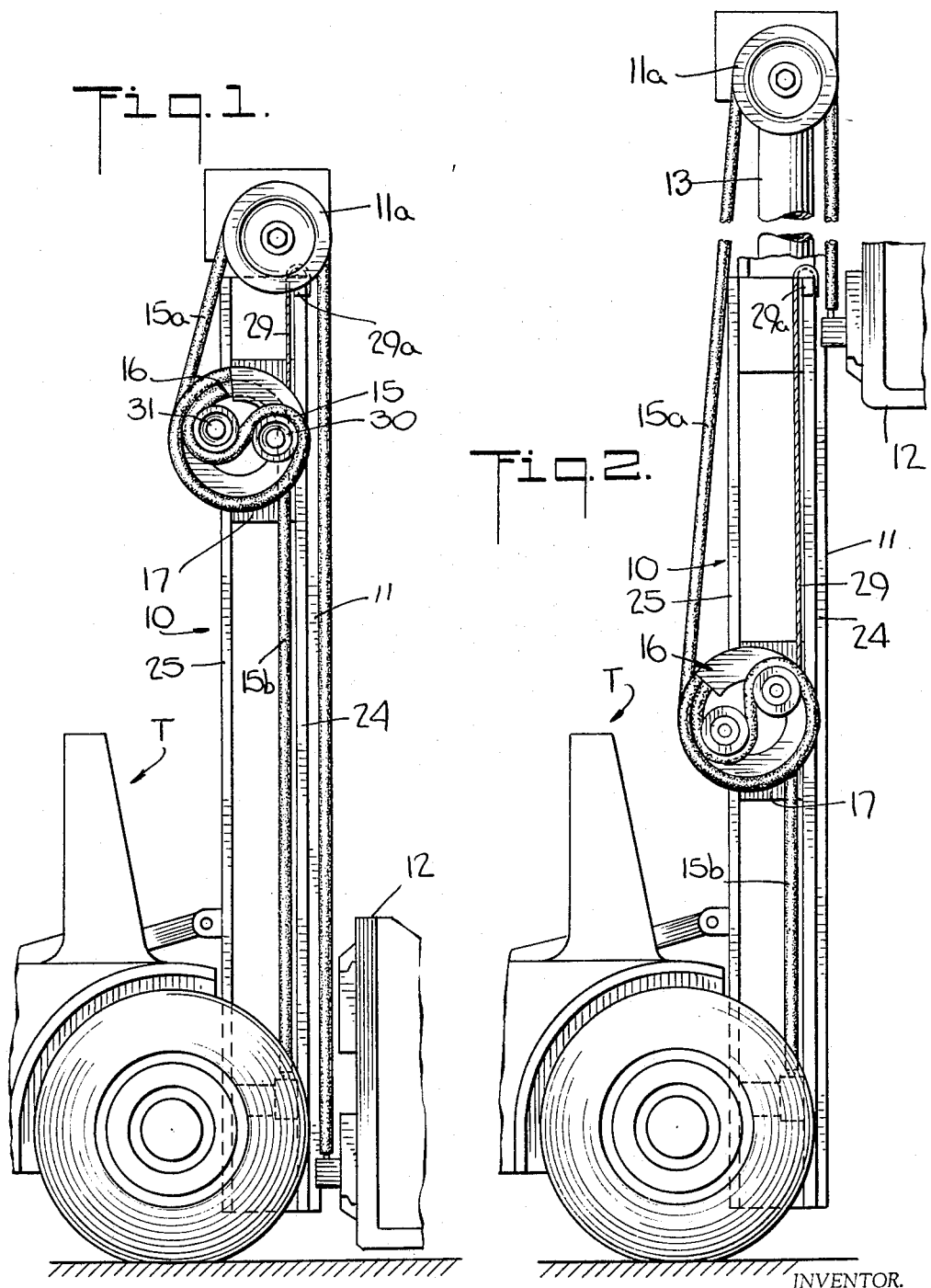

INVENTOR.
GEORGE F. QUAYLE
BY
ATTORNEY

Dec. 6, 1966 G. F. QUAYLE 3,289,870
POWER LINE REEL FOR A LIFT TRUCK
Filed Dec. 24, 1964 4 Sheets-Sheet 4
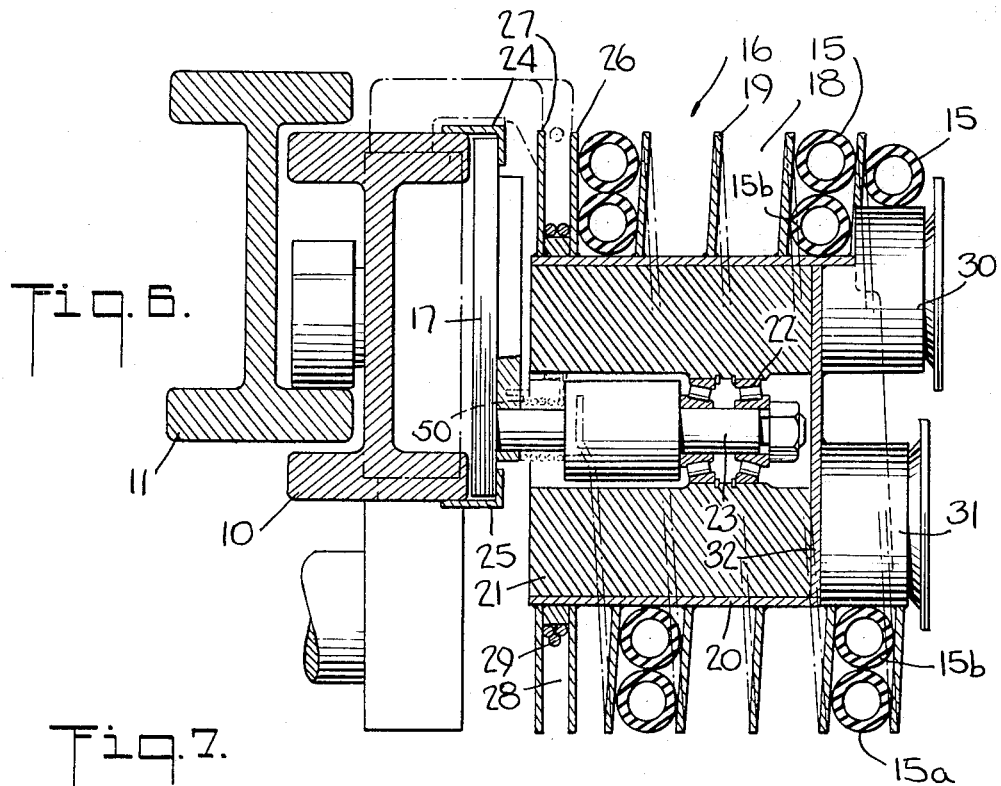
INVENTOR.
GEORGE F. QUAYLE
BY
ATTORNEY United States Patent Office 3,289,870
Patented Dec. 6, 1966

3,289,870
POWER LINE REEL FOR A LIFT TRUCK
George F. Quayle, Jenkintown, Pa., assignor to Eaton Yale & Towne Inc., New York, N.Y., a corporation of Ohio
Filed Dec. 24, 1964, Ser. No. 421,010
9 Claims. (Cl. 214—672)

This invention relates to a lift truck and in particular, to a reel arrangement for taking up and storing slack in a flexible power line, such as a hose line or electric cable, which is connected between a power source on the truck and the vertical movable load carriage of the truck.

Where a substantial length of power line must be taken up and fed out as the load carriage is moved vertically from a fully lowered position to a fully elevated position, it has been the practice to utilize a stationary spring wound reel on which the power line is wound and stored and from which the power line is dispensed as needed. While such an arrangement solves the problem of storing and protecting a long length of power line, it has the disadvantage of requiring an expensive rotary coupling for connecting the power line on the reel with a line from the source of power on the truck. Such a rotary coupling is also expensive and subject to wear so that frequent maintenance or replacement is required.

The purpose of this invention is to provide an improved reel arrangement which will store a long length of power line, but which does not require a rotary coupling. Thus, with the reel arrangement of the invention the power line may be made continuous from the source of power on the truck to the vertically movable load carriage and the problems inherent in the use of a rotary coupling are thereby avoided.

To this end, the arrangement of the invention includes a rotatable storage reel mounted for bodily vertical movement on the truck, preferably on the stationary uprights of the truck. A flexible power line is wound on this reel with one end of the power line extending downwardly and connected to a power source on the truck and the other end extending upwardly over a sheave on the uprights and connected to the load carriage. The power line is so wound on the reel that both ends thereof are wound on to the reel when the reel is rotated in one direction and both ends of the power line are unwound from the reel when the reel is rotated in the opposite direction.

With this arrangement, when tension is exerted on the power line by upward movement of the load carriage, the reel is rotated in a direction to unwind both ends of the power line from the reel. As the power line is unwound from the reel, the tension in both ends of the line is equalized by upward bodily movement of the reel whereby both ends of the power lines are maintained slackfree. When the tension in the power line is relieved by downward movement of the load carriage, the reel rotates in a direction to take up the power line, while at the same time the reel moves bodily downwardly to maintain the power line slackfree. Thus, with this arrangement, there is no need for an expensive rotary coupling and the power line may be made continuous from the power source to the load carriage.

As a feature of the invention, the reel is rotated to wind the power line on the reel by means of a cable which is anchored at one end to the truck, above the reel, and is wound at the other end on the reel in a direction opposite to that which the power line is wound on the reel. As the reel moves bodily downward under the force of gravity when the tension in the power line is relieved, the unwinding of the cable from the reel causes rotation of the reel to thereby wind both ends of the power cable on the reel.

As a further feature of the invention, the reel is formed with a spiral groove of substantial depth and both ends of the power line, including the end extending to the power source and the end extending to the low carriage are wound in the same groove with one superimposed on top of the other.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized on a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Other objects and advantages of the invention will become apparent in the following description when read in conjunction with the accompanying drawings wherein:

FIG. 1 is a partial side elevational view of a lift truck incorporating the reel arrangement of the invention.

FIG. 2 is a view similar to that of FIG. 1 but showing the carriage and uprights partially elevated.

FIG. 3 is a view similar to FIG. 1 but showing the uprights and carriage fully elevated.

FIG. 4 is a view partial reel elevational view with the uprights and carriage fully elevated.

FIG. 6 is a longitudinal sectional view of the reel.

FIG. 7 is an enlarged end view of the reel.

Figure 5:
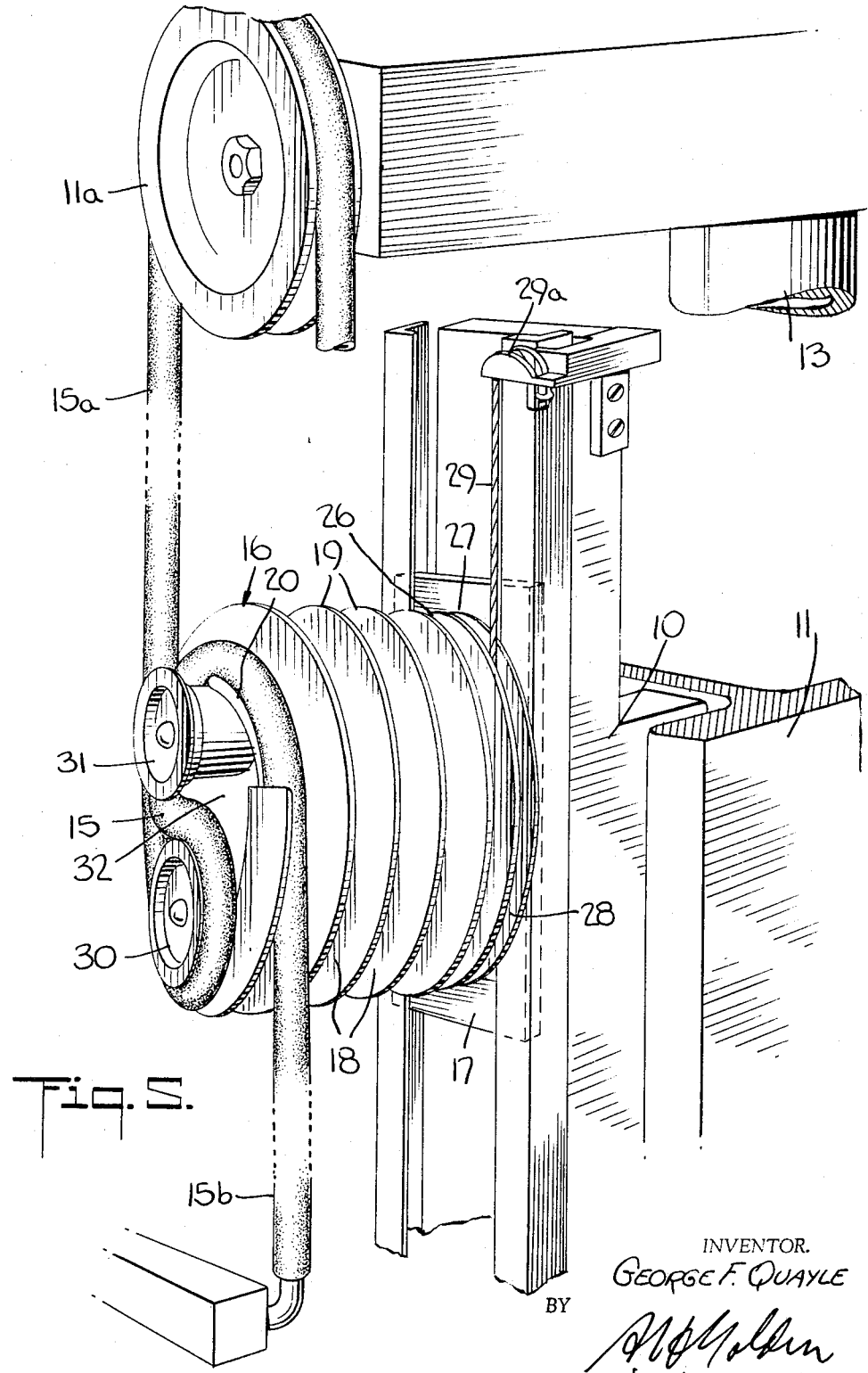
FIG. 5 is a perspective view showing the hose reel arrangement of the invention with parts broken away and in section.

Referring to the drawings, and in particular to FIGS. 1 and 2, the reel arrangement of the invention is shown applied to a conventional lift truck T having stationary or primary uprights 10, secondary uprights 11, mounted for vertical movement on the primary uprights 10, and a load carriage 12 mounted for vertical movement on the secondary uprights 11. The load carriage 12 is adapted to be elevated relatively to the secondary uprights 11 and the secondary uprights 11 are adapted to be elevated relatively to the primary uprights 10 in the conventional manner by a lift ram 13 and lift chains 14, which are partially shown in FIG. 4.

The reel arrangement of the invention, whereby a power line 15 connected at one to a power source on the truck and connected at the other end to the load carriage 12 is payed out or taken up and stored incidental to the vertical movement of the carriage 12, includes a storage reel 16 mounted for rotation on a heavy plate 17, which in turn, is mounted for vertical movement on the primary uprights 10.

As shown in FIGS. 5 and 6, the reel 16 is provided with a continuous spiral groove 18 of sufficient depth to accommodate two thicknesses of the power line 15. The spiral groove 18 is conveniently formed by a continuous plate 19 formed as a spiral and secured to a sleeve 20. The sleeve 20, in turn, is secured to a solid hub member 21, and the hub member 21 is supported for rotation by suitable bearings 22 on a shaft 23 which is rigidly secured at one end to the plate 17. The plate 17 is mounted for free vertical movement on the side of the primary uprights 10 by vertical angle guides 24 and 25, which are secured to the flanges of one of the uprights 10. The reel 16 therefore may rotate about the shaft 23 and may also move bodily in the vertical direction with the plate 17.

Still referring to FIGS. 5 and 6, a pair of axially spaced annular plates 26 and 27 are secured to the sleeve 20 at the inner end of the spiral plate 19 and together form a groove 28 for accommodating and storing a cable 29 wound on the reel. As will be described in more detail hereinafter, the cable 29 is anchored at one end to the top of the primary uprights 10 as shown at 29a in FIG. 5, and is wound on the reel 16 in the opposite direction to that of the power line 15, whereby during downward bodily movement of the reel 16 with the plate 17, the cable 29 effects rotation of the reel in a direction to wind the power line 15 on the reel 16.

As best shown in FIGS. 5 and 6, one end of the spiral groove 18 is open to a pair of posts 30 and 31, which are secured to and extend from an end plate 32, which in turn, is rigidly fastened to the hub member 21. In assembling the power line to the reel 16, an intermediate portion of the power line 15 is secured around the posts 30 and 31, as best shown in FIG. 5, whereby the power line is, in effect, doubled back on itself in juxtaposed relation, and one portion 15a of the power line 25 extended upwardly over a sheave 11a mounted on a beam at the upper end of the secondary uprights 11 and the end thereof connected to the carriage 12. The other portion 15b, of the power line 15 is extended downwardly and its end is connected to a suitable power source on the truck.

With this arrangement, when the reel 16 is rotated in a counterclockwise direction to the position shown in FIG. 5, both ends, 15a and 15b, of the power line 15 are wound in the spiral groove 18 on the reel 16 with the end 15a superimposed on top of the end 15b, as shown in FIG. 6. When the reel 16 is rotated in a clockwise direction both ends 15a and 15b are unwound from the reel 16.

The action of this reel arrangement in paying out or taking up the power line 15 incidental to vertical movement of the load carriage 12 is shown by a comparison of FIGS. 1, 2 and 3.

Referring first to FIG. 1, in which the secondary uprights 11 and the load carriage 12 are shown in the fully lowered position, the reel 16 at this time is in an elevated position. As the carriage 12 is first lifted relatively to both the primary uprights 10 and the secondary uprights 11 to provide free lift of the carriage, the reel 16 moves downwardly under gravity and is simultaneously rotated in a counterclockwise direction by the cable 29, whereby both ends 15a and 15b are wound on to the reel 16. Downward movement of the reel 16 at this time equalizes the tension in the ends 15a and 15b of the line 15 and maintains both ends slackfree.

Thereafter, as both the secondary uprights 11 and the load carriage 12 are raised to the fully elevated position as shown in FIG. 3, the tension exerted on the ends 15a and 15b of the power line 15 effects rotation of the reel 16 in the clockwise direction whereby both ends of the power line 15 are unwound from the reel 16. At the same time, the reel moves bodily upwardly to equalize the tension in both ends of the power line and maintain the ends slackfree.

In the lowering sequence, the reverse takes place, with the reel 16 first being rotated in the counterclockwise direction and moving downwardly to take up the power line 15, and the reel thereafter being rotated in the clockwise direction and elevated to pay out the power line as the carriage 12 moves to the fully lowered position as shown in FIG. 1.

The rotation of the reel 16 during downward movement of the reel is most simply, least expensively and most reliably attained by the arrangement of the cable 29 anchored at one end to the top of the primary uprights and wound on the reel 16, as previously described. However, other means may be employed such, for example, as a coiled spring 50 mounted on the shaft 30 as shown in FIG. 6 in phantom lines. The ends of the spring 50 are connected respectively to the plate 17 and the hub member 21 in a manner such that the spring is fully wound when the reel is in its uppermost position. Thus, as the reel is lowered, the spring unwinds and urges the reel to turn in a counterclockwise direction to wind the ends of the power line on the reel.

From the preceding description, it can be seen that there is provided a novel reel arrangement for the power line of a lift truck which will take up a long length of power line without the necessity of a rotary coupling at the reel. While one form of the invention has been shown and described, it will be appreciated that this is for the purpose of explanation and illustration and that changes and modifications may be made therein without departing from the spirit and scope of the invention. It will also be appreciated that the reel may be used with various types of power line, such as electric cables, hydraulic hose and air hose, and that the power transmitted by the power line to the load carriage may be utilized to operate various load manipulators or other devices provided on the load carriage.

I now claim:

1. In a truck, uprights mounted on said lift truck, a load carriage mounted for vertical movement relatively to said uprights, a storage reel mounted for rotation relatively to said uprights and having a continuous helical groove, a power source on said truck, a power actuated device on said load carriage, a flexible power line extending from said power source to said device, means whereby the medial portion of said power line is secured at said storage reel with both lengths thereof extending from said medial portion lying in juxtaposed relation in said helical groove whereby said lengths of the power line are wound onto said reel when said reel is rotated in one direction and both of said lengths of said power line are unwound from said reel when said reel is rotated in the opposed direction.

2. In a combination of the class described, a rotatable storage reel having a helical groove, a power line having a medial portion and opposed lengths extending from said medial portion, said power line being so wound on said reel that both said opposed lengths leading from said medial portion lie juxtaposed in said helical groove so that when said reel is rotated in one direction both lengths are wound onto said helical groove in said juxtaposed relation while both said lengths of said power line are unwound from said helical groove when said reel is rotated in the opposite direction.

3. In a lift truck, uprights mounted on said lift truck, a load carriage mounted for vertical movement relatively to said uprights, a power source, a rotatable storage reel having a helical groove, a power line having a medial portion and opposed lengths extending from said medial portion, said medial portion being wound around said reel with one of said lengths extending to said power source and the other length extending to said load carriage, and the two lengths of said power line lying juxtaposed in said helical groove so that both said lengths of said power line are wound onto said reel when said reel is rotated in one direction and both said lengths of said power line are unwound from said reel when said reel is rotated in the opposite direction.

4. In a lift truck, uprights mounted on said lift truck, a load carriage mounted for vertical movement relatively to said uprights, a storage reel mounted for rotation relatively to said uprights and having a continuous helical groove, a power source on said truck, a power actuated device on said load carriage, a flexible power line connected at one end to said power source and at its other end to said device, whereby said power source actuates said device, and both end portions of said power line extending from said source and said device being wound on said storage reel in varying lengths and in juxtaposed relation in said helical groove, so that both said ends of the power line are wound onto said reel when said reel is rotated on one direction and both of said ends of said power line are unwound from said reel when said reel is rotated in the opposed direction.

5. In a lift truck, uprights mounted on said lift truck, a load carriage mounted for vertical movement relatively to said uprights, a power source, a rotatable storage reel, a power line extending from said power source around said reel and to said load carriage, said reel having a spiral channel formed externally thereof, means at the outer end of said reel for securing said power line thereto, and means at the outer end of said reel for guiding the ends of said power line in the same direction and in superimposed relationship into the said channel.

6. In a lift truck, uprights mounted on said lift truck, a load carriage mounted for vertical movement relatively to said uprights, a power source, a rotatable storage reel, mounting means for securing said reel to one of the uprights, said reel comprising a hub, a spiral channel formed externally of said hub, means at the outer end of said hub for securing said power line to the hub and means at the outer end of said hub for guiding the end of said power line into said channel in the same direction and in superimposed relationship.

7. In a lift truck, uprights mounted on said lift truck, a load carriage mounted for vertical movement relatively to said uprights, a power source, a rotatable storage reel, mounting means for securing said reel to the uprights, said reel having a spiral channel formed externally thereof, posts at the outer end of said reel about which said line extends in opposite directions, said channel terminating at its leading end adjacent one of said posts for guiding the ends of said power line in the same direction and in superimposed relationship into said channel.

8. In a lift truck, uprights mounted on said lift truck, a load carriage mounted for vertical movement relatively to said uprights, a power source, a rotatable storage reel mounted for vertical movement on said uprights, a power line wound around said reel with one end of said power line extending from said reel to said power source and the other end of said power line extending to said load carriage, said ends of said power line being wound upon said reel in the same direction, and cable means wound upon said reel in a direction opposite to that of said power line for urging said reel to rotate in a direction to wind the power line thereon when said reel moves downwardly by gravity.

9. In a lift truck, uprights mounted on said lift truck, a load carriage mounted for vertical movement relatively to said uprights, a power source, a rotatable storage reel, a power line, the medial portion of said line being wound around said reel with one end of said power line extending from said reel to said power source and the other end of said power line extending to said load carriage, said power line being wound upon said reel in the same direction, said reel being mounted on said uprights for movement parallel and relative to said uprights, and cable means wound upon said reel in a direction opposite to said power line for urging said reel to rotate in a direction to wind the power line thereon when said reel moves downwardly by gravity.

References Cited by the Examiner

UNITED STATES PATENTS

| | | | |
|---|---|---|---|
| 1,455,715 | 5/1923 | Danese | 242—107.12 |
| 2,031,434 | 2/1936 | Stern et al. | 242—107.12 |
| 2,724,520 | 11/1955 | Overbeck | 187—9 |

FOREIGN PATENTS

| | | |
|---|---|---|
| 1,108,692 | 9/1955 | France. |
| 105,983 | 11/1942 | Sweden. |

SAMUEL F. COLEMAN, *Primary Examiner.*